US009189775B2

(12) United States Patent
DeLuca et al.

(10) Patent No.: US 9,189,775 B2
(45) Date of Patent: Nov. 17, 2015

(54) MESSAGE DISTRIBUTION AND VIEWING RULES IN A NETWORK

(75) Inventors: Lisa Seacat DeLuca, San Francisco, CA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 13/552,143

(22) Filed: Jul. 18, 2012

(65) Prior Publication Data

US 2014/0025752 A1    Jan. 23, 2014

(51) Int. Cl.
G06F 15/16 (2006.01)
G06Q 10/10 (2012.01)
G06Q 50/00 (2012.01)

(52) U.S. Cl.
CPC .............. *G06Q 10/107* (2013.01); *G06Q 50/01* (2013.01)

(58) Field of Classification Search
CPC .... G06Q 10/107; H04L 12/585; H04L 12/58; H04L 12/581; H04L 12/5855
USPC .................. 709/201–206, 217–219, 225, 232
See application file for complete search history.

(56) References Cited

U.S. PATENT DOCUMENTS

| | | | | |
|---|---|---|---|---|
| 5,036,518 | A * | 7/1991 | Tseung | 714/748 |
| 5,260,778 | A * | 11/1993 | Kauffman et al. | 725/33 |
| 5,893,911 | A * | 4/1999 | Piskiel et al. | 707/694 |
| 6,014,429 | A * | 1/2000 | LaPorta et al. | 379/88.15 |
| 6,400,942 | B1 * | 6/2002 | Hansson et al. | 455/426.1 |
| 6,757,713 | B1 * | 6/2004 | Ogilvie et al. | 709/206 |
| 6,775,689 | B1 * | 8/2004 | Raghunandan | 709/206 |
| 7,251,495 | B2 * | 7/2007 | Keyani et al. | 455/466 |
| 7,890,593 | B2 * | 2/2011 | Chen et al. | 709/206 |
| 7,917,589 | B2 * | 3/2011 | Kronlund et al. | 709/206 |
| 8,019,821 | B2 * | 9/2011 | Hamilton et al. | 709/206 |
| 8,166,126 | B2 * | 4/2012 | Bristow et al. | 709/207 |
| 2005/0108351 | A1 * | 5/2005 | Naick et al. | 709/207 |
| 2007/0106736 | A1 * | 5/2007 | Shepherd | 709/206 |
| 2007/0261099 | A1 * | 11/2007 | Broussard et al. | 726/1 |
| 2008/0052759 | A1 * | 2/2008 | Kronlund et al. | 726/2 |
| 2009/0282494 | A1 * | 11/2009 | Bhide et al. | 726/28 |
| 2010/0275021 | A1 * | 10/2010 | Kristiansen et al. | 713/171 |
| 2013/0241937 | A1 * | 9/2013 | DeLuca et al. | 345/501 |

OTHER PUBLICATIONS

Aggarwal, Vaneet, Youjian Liu, and Ashutosh Sabharwal. "Message passing in distributed wireless networks." In Information Theory, 2009. ISIT 2009. IEEE International Symposium on, pp. 1090-1094. IEEE, 2009.*

(Continued)

*Primary Examiner* — Liangche A Wang
*Assistant Examiner* — Melaku Habtemariam
(74) *Attorney, Agent, or Firm* — Cantor Colburn LLP; William A. Kinnaman, Jr.

(57) ABSTRACT

A system, method and computer-readable medium for displaying a message over a network are disclosed. A distribution indicator is associated with a defined distribution rule for displaying messages over the network. A message includes the distribution indicator in the message. The message is displayed over the network according to the distribution rule indicated by the distribution indicator included in the message.

16 Claims, 3 Drawing Sheets

(56) References Cited

OTHER PUBLICATIONS

Ahmadi, Hamed, Arman Mehrbakhsh, and Ehsan Asgarian. "Towards an efficient method for spreading information in social network." in Modelling & Simulation, 2009. AMS'09. Third Asia International Conference on, pp. 152-157. IEEE, 2009.*

Hariri, Behnoosh, Shervin Shirmohammadi, and Mohammad Reza Pakravan. "A distributed interest management scheme for massively multi-user virtual environments." In Virtual Environments, Human-Computer Interfaces and Measurement Systems, 2008. VECIMS 2008. IEEE Conference on, pp. 111-115. IEEE, 2008.*

* cited by examiner

MESSAGE DISTRIBUTION AND VIEWING RULES IN A NETWORK

BACKGROUND

The present invention relates to network communication, and more specifically, to sending messages to a group of individuals.

A social network makes it possible for a user to form connections with other people using a profile stored at a social network site. In many cases, the user will form connections to several people based on different relations, interest, affiliations, backgrounds, etc. In many cases, the social networking site allows the user to form groups based on these relations, interests, etc. and to aggregate people into these groups accordingly. Once connections are formed, the user may wish to communicate with people within the network. While it is possible to send a message to every person in a social network, generally the user may wish to send a message only to a particular person or to particular group of people.

SUMMARY

According to one embodiment, a method of displaying a message over a network includes: associating a distribution indicator with a defined distribution rule for sending messages over the network; composing the message to include the distribution indicator in the message; and displaying the message over the network according to the distribution rule indicated by the distribution indicator included in the message.

According to another embodiment, a system includes a network including a user; a user connection device operatively coupled to the network configured to define a distribution rule for the user and associate a distribution indicator with the defined distribution rule; and a distribution engine operatively coupled to the network configured to receive a message from the user connection device that includes the distribution indicator therein and display the received message over the network according to the distribution rule indicated by the distribution indicator included in the message.

According to another embodiment, a computer program product is provided, the computer program product including a computer readable storage medium having computer readable program code embodied therewith, the computer readable program code comprising instructions that, when executed by a computer, implement a method of displaying a message over a network, wherein the computer readable program code comprises computer readable program code configured to: define a distribution rule over the network; associate a distribution indicator with the distribution rule; and display a message having the distribution indicator therein over the network according to the distribution rule indicated by the distribution indicator included in the message.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
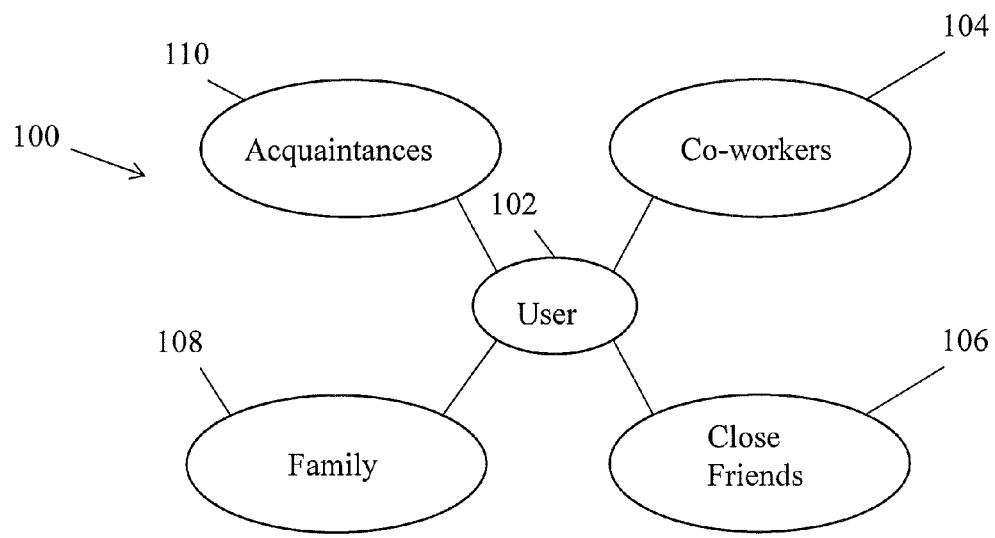
FIG. 1 shows an exemplary set of groups in an exemplary social network.

With reference now to FIG. 1, an exemplary set of groups in a social network 100 is shown for illustrative purposes. A social network is a set of people that are connected based on shared interests, activities, affiliations, backgrounds, etc. In an exemplary social network, a user creates a representation or profile that is stored at a social networking site and forms connections between her profile and the profiles of other users at the social networking site. The user may create groups based on various interests, activities, affiliation, backgrounds, etc. and to organize the other users by grouping them accordingly. The exemplary social network 100 of FIG. 1 includes the user ("User" 102) and several exemplary social groups associated with the user, which social groups include "co-workers" 104, "close friends" 106, "family" 108 and "acquaintances" 110. One aspect of the social network allows the user to send messages back and forth with the other users of the social network. The user 102 may wish to send a message to everybody in her social network or only to people in a selected group. For example, the user may wish to communicate "I'm getting married" to everybody in her social network, but may only wish to communicate "Doughnuts at my cubicle" only to members of the co-workers group 104, since such a message is generally not relevant to members of the family group 108 or the close friends group 106, etc. In one embodiment disclosed herein, a method is provided for sending a message to a selected group or groups in the network. The invention is not limited to operation on a social network. Alternate networks may include a messaging system, such as Instant Messenger, etc. A set of distribution rules are defined and distribution indicators are selected and associated with the distribution rules. The distribution indicators may be included in a body of a message and facilitate sending the message to the selected group or groups.

Figure 2:
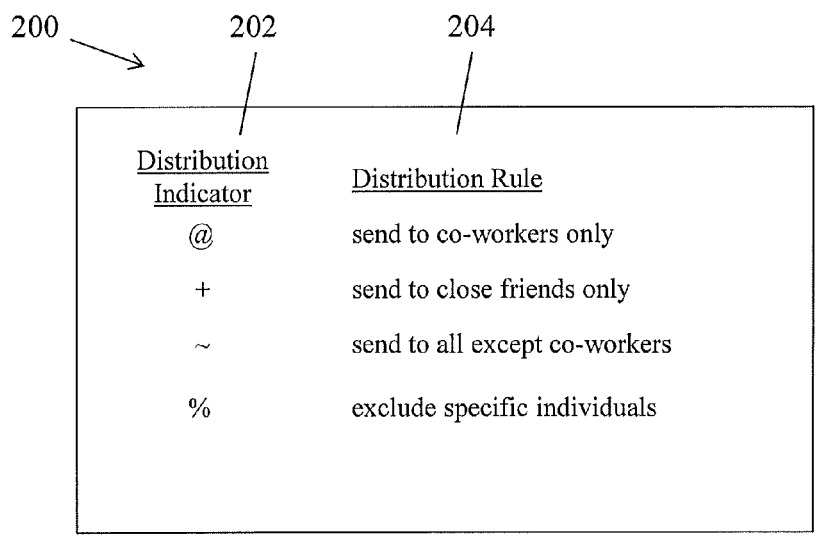
FIG. 2 shows a list of distribution indicators and associated distribution rules in an exemplary embodiment.

With reference now to FIG. 2, an exemplary list 200 of distribution indicators 202 and associated distribution rules 204 is shown. A distribution indicator 202 may be a single character that may be included in a message while the message is being composed or after the message has been composed. An exemplary distribution indicator is associated with an exemplary distribution rule which defines a group for receiving a message. The distribution rule may be include a particular group or exclude a particular group. In addition, the distribution rule may be defined with respect to a single group or to a plurality of groups. The exemplary indicators of FIG. 2 are defined as follows: "@"=coworkers only; "+"=close friends only; "~"=exclude co-workers; and "%"=exclude specific individuals. Thus, the "@" distribution indicator, when associated with a message, sends the message to the exemplary "co-workers" group 104 and the "~" distribution indicator, when associated with a message, sends the message to all members of the social network except those the exemplary "co-workers" group 104, and so forth. In one embodiment, the distribution indicator can be typed into the body of the message while the message is being composed. Alternately, a message can be typed and a message segment highlighted to apply a particular distribution rule, as discussed below with respect to FIG. 4. In an exemplary embodiment, more than one distribution indicator may be included in a message. A distribution indicator may apply to an entire message or to a segment of the message. A distribution indicator is generally associated with a selected message segment by preceding the selected message segment with the distribution indicator in the body of the message. When more than one distribution indicator is included in a message, a distribution indicator that appears later in the message may cancel or override a distribution indicator that appears earlier in the message. Other methods of associating the distribution indicator to a message segment may be used in various embodiments of the invention, including placing the distribution indicator immediately after the selected message segment, or selecting a color or font of the selected message segment to represent the distribution rule, etc.

When the user sends the message, the message is sent to a distribution engine. The distribution engine receives the message, partitions the message into message segments at the distribution indicator and compares the distribution indicators in the body of the message with the list of distribution rules at the distribution engine. The distribution engine thereby uses the distribution rules to send or display the message segments to the selected groups.

Figure 3:
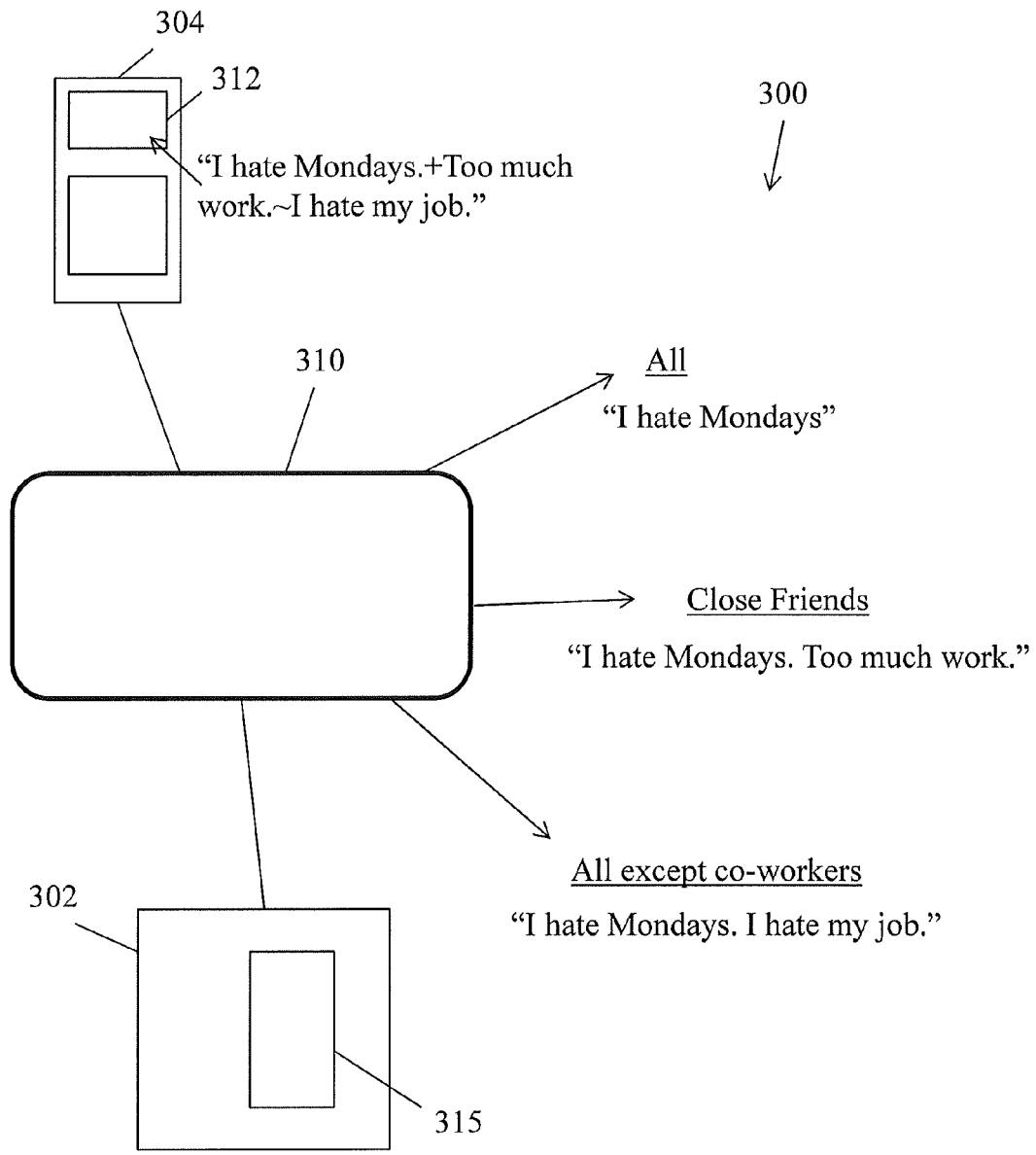
FIG. 3 shows an exemplary system for distributing a message throughout a social network using the exemplary methods disclosed herein.

Referring now to FIG. 3, an exemplary system 300 is illustrated for distributing a message throughout a social network is shown in one embodiment of the disclosure. The system includes a distribution engine 302 which is generally operatively coupled to an exemplary social networking site 310, such as Facebook or Google+. The distribution engine may be at the social networking site or may be provided at another site, such as a third-party site. The user connects to the distribution engine 302 through the social networking site 310 via a user connection device 304. Exemplary user connection devices 304 may include a computer, a laptop, a cellular phone, a tablet such as an iPad, or another electronic communication interface configured to provide access to a social networking site. In one embodiment of the invention, the user may create a set of distribution rules at the user connection device 304. The user may select a group or a plurality of groups, assign a distribution rule to the selected group or plurality of groups and then define a symbol, i.e., the distribution indicator, to represent the distribution rule in the body of the message. A list 315 of the distribution indicators and their associated distribution rules may be stored at the user connection device 304 and/or at the distribution engine 302 as list 315. In various embodiments, the user connection device 304 provides an interface 312, such as a panel, window, menu box, etc., that enables the user to select a group or groups, define a distribution rules over the selected group or groups and associate a selected symbol with the distribution rule. The user may further compose a message at the interface 312. In various embodiments, the user may define the distribution rules and indicators prior to composing a message or while the message is being composed. In one aspect, including the distribution indicators within the message enables the user to specify distribution of the message without use of mouse clicks or other methods cumbersome when using, for example, a smartphone or tablet computer.

Illustration of the method of the present disclosure shown in FIG. 3 is discussed with respect to the following exemplary message which may be typed into a user connection device: "I hate Mondays+Too much work~I hate my job." In exemplary embodiments, this message is typed into interface 312. The message is sent from the user connection device 304 to the distribution engine 302. The distribution engine 302 partitions the message into a first message segment ("I hate Mondays."), a second message segment ("+Too much work.") and a third message segment ("~I hate my job."). The first message segment does not have an associated distribution indicator, so by default the message segment "I hate Mondays" is sent or displayed to all members of the user's social network. The second segment begins with the "+" indicator which corresponds to the "close friends only" distribution rule, so the message segment "Too much work" is sent or displayed only to close friends. The third segment begins with the "~" indicator which corresponds to the "exclude co-workers" distribution rule, so the message segment "I hate my job" is sent or displayed to everybody in the social network except for co-workers.

Figure 4:
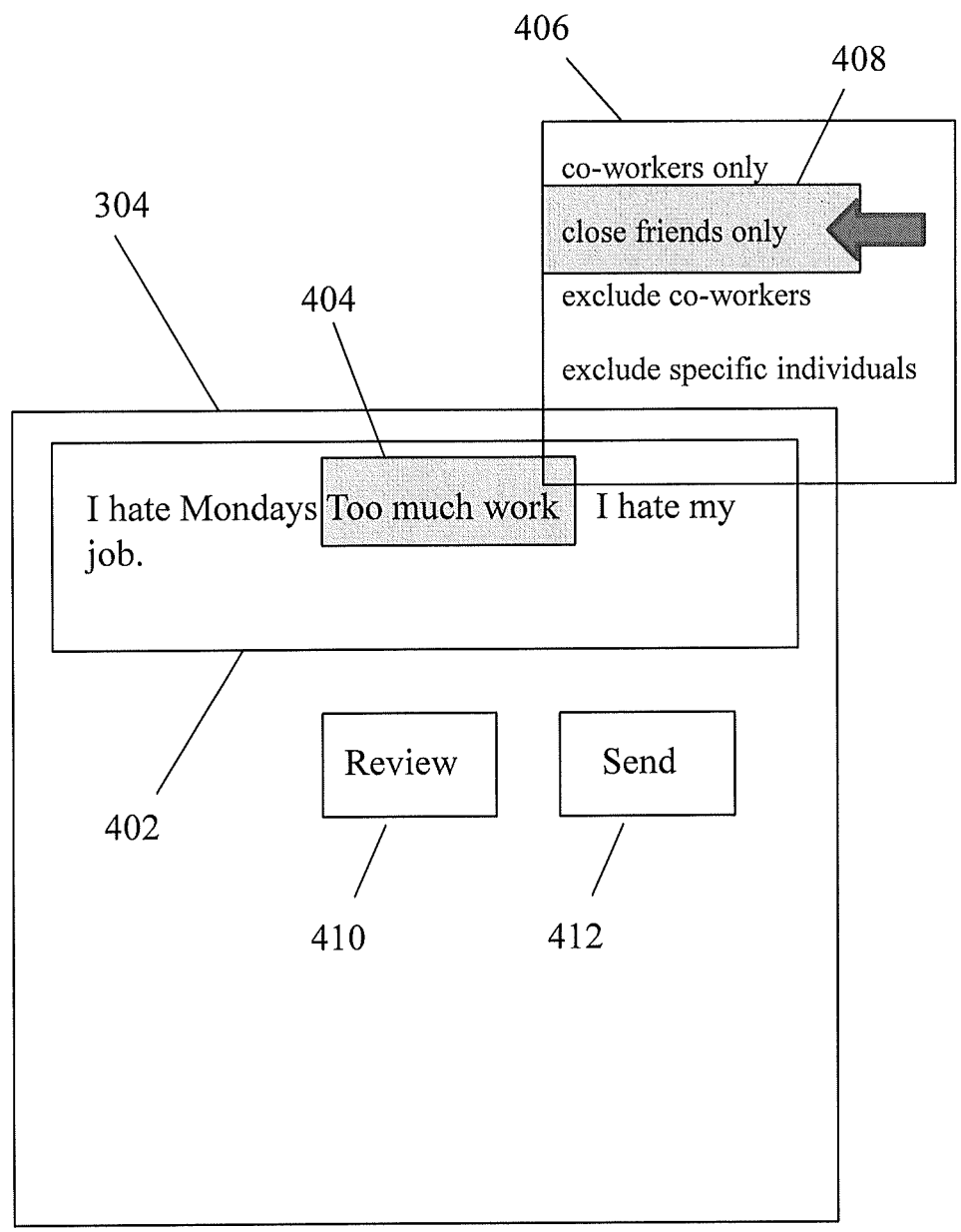
FIG. 4 shows an exemplary interface for composing a message for distribution over the social network of FIG. 1 in one embodiment of the invention.

With reference now to FIG. 4, an exemplary interface of the user connection device 304 for composing a message is shown in an alternate embodiment of the invention. The user may compose the message in a text box 402, highlight or otherwise select a segment of the message 404, obtain a list 406 of the distribution identifiers and/or distribution rules from the user connection device, and select an exemplary distribution rule 408 from the obtained list. In one embodiment, the user connection device 304 may insert the selected distribution indicator in the body of the message with the selected message segment. The user connection device 304 may provide the list in a pop-up window 406 or other suitable display message that appears, for instance, by a right-click on a mouse or other suitable selection technique. In one embodiment, the user connection device 304 provides an option to review the message. When the user selects a review button 410 or suitable 'review' icon, the user may see which message segments will go to which groups according to the distribution indicators in the message. This allows the user to correct the distribution of the message segments before sending the message. The user may click a send button 412 or suitable 'send' icon to send the message.

In another aspect, the distribution rules may include an escape system that allows symbols that serve as the distribution indicators. For instance, the "\" symbol may allow the use of the symbol in the message rather than as a distribution indicator. As an example, suppose "+" is a distribution indicator. If a user wants to send an exemplary message "You+ Me=US" to a friend, then this message could be written as "You\+Me=US". The distribution engine, upon encountering the "\+", will know that the plus sign is being used as part of the message rather than as a distribution indicator and will send or display the message without partitioning the message.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of displaying a message over a network, comprising:
   defining, by a user, a distribution indicator character and a distribution rule;
   associating the user-defined distribution indicator character with the user-defined distribution rule for sending messages to a selected group of recipients over the network;
   composing the message at a user connection device;
   including the distribution indicator character in a body of the message to specify the selected group of recipients by typing the distribution indicator character into the message;
   partitioning the message into two or more message segments using the distribution indicator character, wherein a first of the two or more message segments is for sending to a first group of recipients and a second of the two or more message segments is for sending to a second group of recipients;
   selecting a button to review the message to view the selected group of recipients specified by the distribution indicator character;
   sending the message over the network; and
   displaying the message over the network at a recipient device according to the distribution rule associated with the distribution indicator character.

2. The method of claim 1, wherein the distribution indicator character is associated with at least one of the two or more message segments, further comprising displaying the at least one message segment over the network at the recipient device using the distribution rule indicated by the associated distribution indicator character.

3. The method of claim 2, further comprising removing the distribution indicator character from the at least one message segment when displaying the at least one message segment on the recipient device.

4. The method of claim 1, further comprising notifying the user which group of recipients will receive which message segments based on the distribution indicator character included in the message.

5. The method of claim 1, wherein the distribution rule includes displaying the message to all but the selected group of recipients in the network.

6. The method of claim 1, further comprising using the user connection device coupled to the network to perform at least one of: defining the distribution rule; composing the message; including the distribution indicator character in the body of the message by typing of the distribution indicator character into the body of the message while composing the message; and sending the message to a distribution engine.

7. The method of claim 1, wherein including the distribution indicator in the body of the message further comprises typing the distribution indicator character to precede a selected segment of the message to associate the distribution rule with the selected segment of the message.

8. A system comprising:
   a user connection device operatively coupled to the network configured to allow a user to define a distribution rule for sending a message of a messaging system to a selected group of recipients over the network, allow the user to define a distribution indicator character, and allow the user to associate the user-defined distribution indicator character with the user-defined distribution rule, the user connection device enabling the user to compose the message in a text box and include the distribution indicator character into a body of the message to specify the selected group of recipients, the user connection device including button selectable to review the selected group of recipients specified by the distribution indicator character; and
   a distribution engine operatively coupled to the network configured to receive the message from the user connection device, use the distribution indicator character to partition the received message into two or more message segments, wherein a first of the two or more message segments is for sending to a first group of recipients and a second of the two or more message segments is for sending to a second group of recipients, send the message over the network and display the received message over the network at a recipient device according to the distribution rule associated with the distribution indicator character.

9. The system of claim 8, wherein the distribution engine associates the distribution indicator character with at least one of the two or more message segments and displays the at least one of the two or more message segments over the network at the recipient device using the distribution rule associated with the distribution indicator character.

10. The system of claim 8, wherein the user connection device is further configured to provide a display that notifies the user which groups in the network will receive which message segments based on the distribution indicator character included in the message.

11. The system of claim 8, wherein the distribution rule is at least one of: display the message to the selected group of recipients in the network; display the message to all but the selected group of recipients in the network; display the message to a selected individual in the network; and display the message to all but a selected individual in the network.

12. The system of claim 8, wherein the user connection device is further configured to perform at least one of: defining the distribution rule; composing the message; and including the distribution indicator character in the body of the message by typing of the distribution indicator character into the message.

13. The system of claim 8, wherein the user connection device is further configured to include the distribution indicator character in the message by typing of the distribution indicator character to precede a selected segment of the message to associate the distribution rule with the selected segment of the message.

14. A non-transitory computer readable storage medium having computer readable program code embodied therein, the computer readable program code comprising instructions that, when executed by a processor, implement a method of displaying a message over a network, wherein the method comprises:
   allowing a user to define a distribution rule for sending a message over the network to a selected group of recipients;
   allowing the user to define a distribution indicator character and associate the distribution indicator character with the distribution rule;
   enabling a user to type into a text box at the user connection device, type the distribution indicator character into a body of the message to specify the selected group of recipients and review the message to view the selected group of recipients specified by the distribution indicator character;

partitioning the message into two or more message segments using the distribution indicator character, wherein a first of the two or more message segments is for sending to a first group of recipients and a second of the two or more message segments is for sending to a second group of recipients sending the message over the network; and displaying the message over the network at a recipient device according to the distribution rule associated with the distribution indicator character.

15. The non-transitory computer readable medium of claim 14, wherein the method further comprises:

associating the distribution indicator character with at least one of the two or more message segments; and displaying the at least one message segment over the network at the recipient device using the distribution rule associated with the distribution indicator character.

16. The non-transitory computer readable medium of claim 1, wherein the method further comprises displaying the message over the network using the distribution rule that is selected from the group consisting of: displaying the message to the selected group of recipients in the network; display the message to all but the selected group of recipients in the network; displaying the message to a selected individual in the network; and displaying the message to all but a selected individual in the network.

* * * * *